United States Patent

[11] 3,581,597

| [72] | Inventor | William L. Reiersgaard<br>Portland, Oreg. |
|---|---|---|
| [21] | Appl. No. | 31,828 |
| [22] | Filed | Apr. 29, 1970 |
| [45] | Patented | June 1, 1971 |
| [73] | Assignee | Hy-Torq Corporation<br>Portland, Oreg.<br>Continuation of application Ser. No.<br>759,025, Sept. 11, 1968, now abandoned. |

[54] DIFFERENTIAL DRIVE MECHANISM
18 Claims, 4 Drawing Figs.

[52] U.S. Cl. ..................................................... 74/650,
192/44
[51] Int. Cl. .....................................................F16h 35/04,
F16d 15/00
[50] Field of Search........................................... 74/650,
711; 192/44

[56] References Cited
UNITED STATES PATENTS

| 2,811,232 | 10/1957 | Seidel | 192/44 |
| 2,845,158 | 7/1958 | Morgan | 192/44 |
| 2,897,932 | 8/1959 | Morgan | 192/44 |
| 3,124,972 | 3/1964 | Seliger et al. | 74/650 |
| 3,388,779 | 6/1968 | Roper | 192/44 |

*Primary Examiner*—Arthur T. McKeon
*Attorney*—Buckhorn, Blore, Klarquist and Sparkman

ABSTRACT: A differential drive mechanism has a driven rotatable body serving to drive either or both of a pair of coaxially mounted, axle-driving hubs and to permit overrunning of either hub. Rollers between the hubs and the bodies are mounted in two cages which have limited lost motion therebetween and which are individually retarded by O-ring actuators to move the rollers into driving engagement with the hubs and the body, and are individually held in free running positions by damping O-rings. The body has grooves into which the rollers laterally project and having ramp angles between about 3° and about 6° to wedge the rollers between the body and the hubs.

WILLIAM L. REIERSGAARD
INVENTOR

BY
BUCKHORN, BLORE, KLARQUIST & SPARKMAN
ATTORNEYS

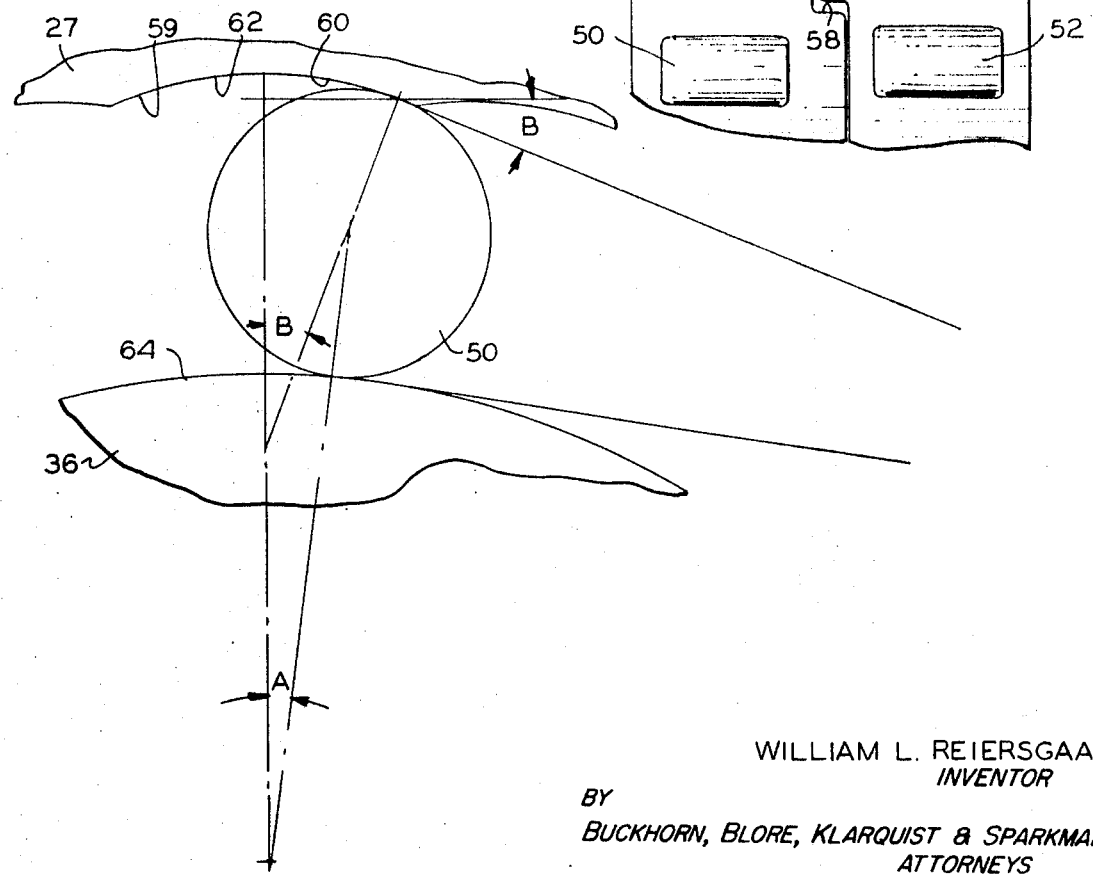

DIFFERENTIAL DRIVE MECHANISM

This application is a continuation of application Ser. No. 759,025, filed Sept. 11, 1968, now abandoned.

BACKGROUND OF THE INVENTION

This invention relates to a differential drive mechanism, and more particularly to a differential drive mechanism of the type providing positive drive for both the right and left wheels of a motor vehicle.

Differential drive mechanisms of the type disclosed in this application are described in U.S. Pat. Nos. 3,124,972 (Seliger and Hegar) and 3,173,309 (Seliger). These patents describe a positive drive differential mechanism in which rollers freely mounted between a drive casing and a driven member alternate between a released position and a driven position, the rollers driving the driven member by being wedged against recesses provided in the inner periphery of the drive casing. The rollers are disposed within annular cages, one of which cages is concentrically and freely mounted on each driven member. The cages are connected by longitudinally extending projections and slots, the projections and slots in one cage being engageable respectively with slots and projections in the opposed case. The width of the slots is greater than the width of the projections, and the width relationship between the slots and projections is selected to permit a balanced rotation between the cages equal to approximately one-half of the free movement of the rollers between their released and driving positions in the recesses. Friction means are mounted between the cages and the driven members to cause immediate adjustable rotation of the cages responsive to a differential requirement of the mechanism.

Differential drive mechanisms constructed in accordance with the aforementioned patents, however, are subject to certain disadvantages. Among these is a tendency of the rollers to fluctuate or hop back and forth between their driven and free positions due to the vibrational forces which act upon the mechanism.

Another problem inherent in differential drive mechanisms constructed in accordance with the aforementioned patents occurs when the motor vehicle is being driven at full throttle. A slipping has been experienced wherein the rollers actually break loose from their driven position in wedged engagement with the driving surfaces of the recesses in the drive casing.

Accordingly, it is the primary object of the present invention to provide a new and improved differential driving mechanism of the class described in which the rollers will not have a tendency to fluctuate or hop back and forth between their driving and released positions.

It is a further object of the present invention to provide a new and improved differential drive mechanism in which the rollers will not slip from engagement with the driven members during operation of the differential mechanisms at any power requirement.

A still further object of the present invention is to provide such an improved differential driving mechanism which will minimize the tendency of the rollers to score both the inner peripheral surface of the drive casing and the surfaces of the driven members against which they are wedged into contact.

SUMMARY OF THE INVENTION

The present invention achieves these and other objects and advantages by providing a differential driving mechanism in which actuating means frictionally couple annular cages for rollers and driven hub members. The actuating means cause relative rotation of one of the cages in response to a differential requirement. Damping means frictionally couple the cages and a drive body with a lesser force than that of the actuating means to damp out any tendency of the rollers to fluctuate or hop between their released and driven positions during operation of the vehicle. The actuating means and the damping means may desirably comprise polytetrafluoroethylene O-rings. The actuating O-rings are compressed more than the damping O-rings and a desirable ratio is one in which the compression of the damping O-rings does not exceed 80 percent of the compression of the actuating O-rings. Recesses on the inner periphery of the drive body have ramp angles varying between about 3° and about 6°, which range of angles prevents slippage of the rollers while they are in wedged engagement with the driven members. A desirable permissible circumferential motion of the rollers is limited to a travel of 1½° between the released and driven positions. In order to prevent scoring of the inner periphery of the drive body it may be provided with a hard liner which is shrunk-fit into place. Crowning the contacting surfaces of the rollers also minimizes their tendency to score both the inner periphery of the drive body and the exterior surfaces of the driven hub members.

In the drawings:

FIG. 2 is a vertical sectional view taken along line 2-2 of FIG. 1;

FIG. 3 is an enlarged, fragmentary elevation of a portion of the differential drive mechanism of FIG. 1; and FIG. 4 is an enlarged schematic view of the differential drive mechanism of FIG. 1.

Figure 1:
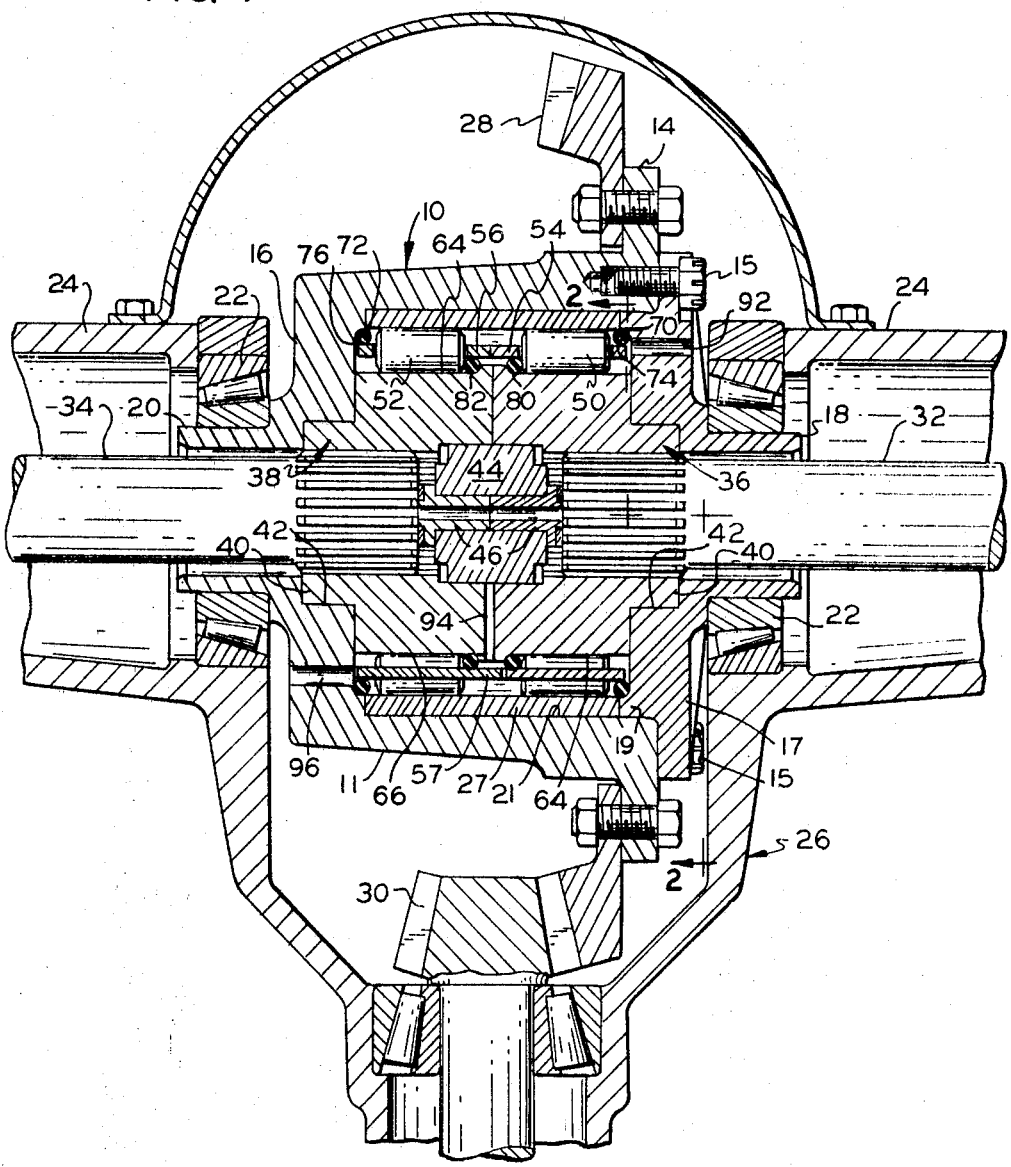
FIG. 1 is a longitudinal sectional view of an improved differential drive mechanism forming one embodiment of the invention.

Referring now in detail to the drawings, there is shown in the drawings an improved nonslip automobile differential forming a specific embodiment of the invention. The differential includes a drive casing including a forged or cast steel body 10 having a cylindrical body portion 11 and an outer drive flange 14 and a radially ribbed flange 16 integral with the body portion. A cap 17 of ductile iron is bolted by capscrews 15 to the drive flange 14 and has an annular portion 19 fitting closely into cylindrical counterbore 21 in the body portion 11. Hub portions 18 and 20 of the cap 17 and the flange 16 are journaled in radial-and-thrust bearings 22 mounted in tubular axle housing portions 24 of a housing 26. A very hard liner sleeve 27, preferably of 52,100 steel, is fitted into counterbore 21 in the body portion 11 while the body portion is heated and the liner is cooled.

A ring gear 28 bolted to the drive flange 14 is adapted to be driven by a pinion 30 to rotate the casing. Axles 32 and 34 are splined to abutting hubs 36 and 38 which have tubular hub portions 40 journaled in counterbores 42 in the cap 17 and the flange 16. The hubs 36 and 38 rotate freely relative to each other and to the casing. A spacer 44 journals inserts 46 engaging the ends of the axles 32 and 34.

Identical, crowned bearing rollers 50 and 52, preferably of AISI 4,620 steel, are rotatable in cages 54 and 56 spacing the rollers apart and preventing endwise movement of the rollers. The cage 56 has a key portion 57 (FIGS. 1 and 3) extending loosely into a keyway or notch 58 in the cage 54 to permit a predetermined rotative motion between the cages 54 and 56 whereby one of the cages can move to a roller freeing position relative to the body 10 while the other cage is in an operative or drive position relative to the body 10. When either of the cages is in its roller freeing position, the rollers 50 or 52 held in that cage are substantially centered between and out of engagement with ramps 59 and 60 of axially parallel teeth or scallops 62 on the inner peripheral portion of the sleeve 27, and the rollers 50 and 52 rotate freely on the cylindrical outer surface 64 of the hub 36 or on cylindrical outer surface 66 of the hub 38, to permit that hub to overrun the body 10, when the other hub is being driven. When the cages are both in their drive positions, the ramps 59, for forward drive, or the ramps 60 for reverse drive, engage all the rollers 50 and 52 and wedge them against the surfaces 64 and 66 to drive both the hubs 36 and 38 in the same direction. The hubs 36 and 38 are preferably of SAE 52,100 steel or SAE 8,620 steel, coated with manganese iron phosphate, case hardened, oil quenched and tempered after quenching.

Dampers in the form of O-rings 70 and 72 of heat-resistant polytetrafluoroethylene are squeezed slightly between the cages 54 and 56, respectively, and annular grooves 74 and 76 in the body 10. Similarly, actuators in the form of O-rings 80 and 82 of heat-resistant polytetrafluoroethylene are squeezed slightly between the cages 54 and 56, respectively, and the hubs 36 and 38, respectively. The O-rings 70 and 72 may be the commercially available No. 2-340 O-rings of polytetrafluoroethylene, which have high heat resistance and low friction and are not permanently deformable. The O-rings 80 and 82 may be the commercially available No. 2-334O-rings of polytetrafluoroethylene, which have high heat resistance, low friction and are not permanently deformable.

The respective dimensions of the transverse cross-sectional diameters of the O-rings 70, 72, 80 and 82 and the grooves 74 and 76, the diameters of the inner and outer peripheries of the cages 54 and 56 and the external diameter of the hubs 36 and 38 are such that the O-rings 70, 72, 80 and 82 are all radially compressed, with some compression axially from the grooves 74 and 76. The O-rings 80 and 82, however, are compressed more than are the O-rings 70 and 72 so that the actuating O-rings 80 and 82 exert gripping forces on the hubs 36 and 38 and the inner periphery of the cages 54 and 56 which are greater than the gripping forces exerted by the damping O-rings 70 and 72 on the body 10 and the outer peripheries of the cages 54 and 56. This causes a differential between the actuating forces of the O-rings 80 and 82 and the damping forces of the O-rings 70 and 72 with the forces of the O-rings 80 and 82 being greater so that, for sustained forces, the O-rings 80 and 82 predominate over the O-rings 70 and 72. It is desirable for the relative compressions to be such that the damping forces of each O-ring 70 and 72 are substantially, but not appreciably, greater than 80 percent of the corresponding O-ring 80 or 82. This is achieved by compressing the O-rings 80 and 82 more than that of the compression of the O-rings 70 and 72. The O-rings 70 and 72 of 0.210-inch cross-sectional diameter are preferably compressed within the range of from 0.018 to 0.025 inch while the O-rings 80 and 82, which have the same transverse cross-sectional diameter, are compressed within the range of from 0.022 to 0.030 inch, the amount of compression of the O-rings 70 and 72 always being less than 80 percent of that of the O-rings 80 and 82.

The ring gear 28 bolted to the flange 14 is driven by the pinion 30 to rotate the body 10 and the cap 17. Lubricant is supplied through an inlet hole 92 and flows along the rollers to a branch passage 94 and an exit hole 96.

When the axle 32 overruns the drive thereto of the body 10 through the rollers 50, the rollers 50 are rolled out of driven engagement with the ramps 59 or 60 until the slack between the keyway 58 (FIG. 3) and the key 57 is used up, in which condition the rollers 50 are in their free running positions out of engagement with the ramps 59 and 60. The O-rings 70 and 80 then lightly hold the cage 54 in its nondriving position and the O-ring 70 damps out any tendency of the cage and rollers to fluctuate or hop back and forth between driven and free positions due to unsustained vibrational forces tending to move the rollers back and forth between driven and free running positions. However, when the overrunning stops for an appreciable period of time and axle 32 needs to be driven, the O-ring 80 moves the cage 54 back relative to the body 10 until the rollers 50 again wedge between the ramps 59 or 60 and the hub 36 to reestablish the driving condition. Similarly, when the axle 34 overruns the body 10, the O-ring 82 moves the rollers 52, through the cage 56, to their free positions, and the O-ring 72 damps out any tendency of the cage and rollers to hop back and forth between the free and the driven or engaged positions. When the speed of the axle 34 slows relative to the body 10, the O-ring 82 moves the cage 56 back to move the rollers 52 into the wedged, driven conditions.

FIG. 4 is a geometric representation on an enlarged scale of a roller 50 in contact with a ramp scallop 62 and surface 64 of hub 36. The inner peripheral surface of body portion 11 in between scallops 62 is concentric with surfaces 64 and 66, as shown. In FIG. 4 the roller 50 is shown in its extreme wedged position against ramp 60. The maximum permissible circumferential motion of the roller between its released and driven positions is thus represented by the lag angle A. It has been found that limiting angle A to about 1½° is desirable.

As seen in FIG. 4, the ramp angle B is defined as the angle between a line tangent to the point of contact of the scallop 62 and the roller 50 when the roller is in its extreme wedged position and a line perpendicular to the centerline of the scallop 62. By geometry, the angle formed by the centerline of the scallop 62 and the radius of the scallop 62 rotated to the contact point of the scallop 62 and the roller 50 also equals the angle B. It has been found that limiting ramp angle B to between 3° and 6° prevents slippage of rollers 50 or 52 while they are in wedged engagement with the hubs 36 and 38. It has also been found that slippage will occur at any ramp angle appreciably above 6°. A ramp angle appreciably below 3° causes unnecessary diametral forces to be applied to the body, causing body expansion and loss of predetermined ramp angle.

The above described differential drive mechanism eliminates slipping and hopping. Also, the total contact area of the rollers 50 and 52 is sufficiently great and the liner sleeve and hubs are so hard that permanent deformation of the sleeve and the hubs is avoided.

What I claim is:

1. In a differential drive mechanism,
a rotatable drive casing having two sets of ramp portions,
a pair of driven hub members coaxially mounted in end to end relation in the drive casing for independent rotation,
two sets of rollers mounted between said drive casing and the driven hub members for circumferential movement between released positions and driven positions by a wedging action of the rollers therebetween,
a pair of annular cages holding the rollers and rotatable relative to each other and to the casing and hub members,
a pair of frictional actuating means coupling the cages and the driven hub members tending to move the sets of rollers individually into driving positions relative to the casing and the hub members,
and a pair of frictional damping means coupling the cages and the casing tending to resist movement of the cages relative to the casing.

2. The differential drive mechanism of claim 1 wherein the force of each damping means is substantially less than the force of each actuating means.

3. The differential drive mechanism of claim 2 wherein the force of each damping means is not substantially greater than 80 percent of the force of each actuating means.

4. The differential drive mechanism of claim 1 in which at least one of the actuating means and the damping means is an O-ring.

5. The differential drive mechanism of claim 1 wherein both the actuating means and the damping means are O-rings.

6. The differential drive mechanism of claim 5 in which the actuating O-rings are compressed more than the damping O-rings.

7. The differential drive mechanism of claim 6 in which the compression of said damping O-rings does not exceed 80 percent of the compression of said actuating O-rings.

8. The differential drive mechanism of claim 1 wherein the ramp portions of the drive casing have ramp angles not substantially below 3°.

9. The differential drive mechanism of claim 1 wherein the ramp portions of the drive casing have ramp angles not substantially greater than 6°.

10. The differential drive mechanism of claim 1 in which the ramp portions of the drive body have ramp angles between about 3° and about 6°.

11. The differential drive mechanism of claim 1 in which relative circumferential movement of the cages is limited to about 1½°.

12. The differential drive mechanism of claim 1 wherein each of the damping means comprises a frictional member pressed between the casing and one of the cages and frictionally engaging at least one of the casing and said one of the cages.

13. The differential drive mechanism of claim 12 wherein each of the damping means frictionally engages both the casing and said one of the cages.

14. The differential drive mechanism of claim 13 wherein each of the damping means is an O-ring of plastic material on the outer circumference of one of the cages and under lateral compression between that cage and the casing.

15. The differential drive mechanism of claim 1 wherein the rollers are crowned.

16. In a differential drive mechanism,
casing means including a body having a cylindrical bore and a hard metal liner sleeve shrunk fit into the bore and having inner, longitudinal extending grooves forming ramps,
a pair of hubs in the sleeve,
a pair of sets of roller bearings positioned in the grooves and in engagement with the hubs and adapted to be moved between free running positions in the grooves and drive positions engaging the ramps,
a pair of cages engaging the rollers,
and a pair of frictional actuator means engaging the hubs and the cages.

17. The differential drive mechanism of claim 16 including a pair of damping means engaging the cages and the casing means.

18. In a differential drive mechanism,
a rotatable drive casing rotatable on a predetermined axis and having two sets of ramp portions extending parallel to ,
ramp portions of the drive casing having ramp angles between about 3° and about 6°,
a pair of driven hub members coaxially mounted in end to end relation in the drive casing for independent rotation,
two sets of rollers mounted between said drive casing and the driven hub members for circumferential movements between released positions and driven positions by wedging action of the rollers therebetween,
a pair of annular cages holding the rollers and rotatable relative to each other up to about 1½° and to the casing and hub members,
and a pair of frictional actuating means coupling the cages and the driven hub members tending to move the sets of rollers individually into driving positions relative to the casing and the hub members.

UNITED STATES PATENT OFFICE
CERTIFICATE OF CORRECTION

Patent No. 3,581,597          Dated June 1, 1971

Inventor(s)          William L. Reiersgaard

It is certified that error appears in the above-identified patent and that said Letters Patent are hereby corrected as shown below:

Column 6, line 5, after "to" insert -- said axis --

Signed and sealed this 28th day of September 1971.

(SEAL)
Attest:

EDWARD M. FLETCHER, JR.          ROBERT GOTTSCHALK
Attesting Officer                Acting Commissioner of Patents